US012661778B2

(12) United States Patent
Mustapic

(10) Patent No.: US 12,661,778 B2
(45) Date of Patent: Jun. 23, 2026

(54) SPARE ROBOT CONTROLLER

(71) Applicant: ABB Schweiz AG, Baden (CH)

(72) Inventor: Goran Mustapic, Västerås (SE)

(73) Assignee: ABB Schweiz AG, Baden (CH)

( * ) Notice: Subject to any disclaimer, the term of this patent is extended or adjusted under 35 U.S.C. 154(b) by 451 days.

(21) Appl. No.: 17/996,095

(22) PCT Filed: Apr. 20, 2020

(86) PCT No.: PCT/EP2020/060971
§ 371 (c)(1),
(2) Date: Oct. 13, 2022

(87) PCT Pub. No.: WO2021/213609
PCT Pub. Date: Oct. 28, 2021

(65) Prior Publication Data
US 2023/0191595 A1 Jun. 22, 2023

(51) Int. Cl.
H04L 9/08 (2006.01)
B25J 9/16 (2006.01)
G06F 11/1446 (2026.01)

(52) U.S. Cl.
CPC ......... B25J 9/1602 (2013.01); G06F 11/1469 (2013.01); H04L 9/085 (2013.01)

(58) Field of Classification Search
None
See application file for complete search history.

(56) References Cited

U.S. PATENT DOCUMENTS

| 6,543,004 B1 * | 4/2003 | Cagle | .................. | G06F 11/1464 |
| | | | | 714/6.32 |
| 7,565,517 B1 * | 7/2009 | Arbon | ........................ | G06F 8/64 |
| | | | | 713/1 |
| 9,921,823 B2 * | 3/2018 | Gadgil | ...................... | G06F 8/65 |

(Continued)

FOREIGN PATENT DOCUMENTS

| EP | 2006792 A2 * | 12/2008 | ......... G06F 21/6218 |
| JP | H07328970 A | 12/1995 | |

(Continued)

OTHER PUBLICATIONS

International Search Report and Written Opinion of the International Searching Authority; Application No. PCT/EP2020/060971; Completed: Dec. 17, 2020; Mailing Date: Jan. 12, 2021; 18 Pages.

(Continued)

Primary Examiner — Christopher C Harris
(74) Attorney, Agent, or Firm — Whitmyer IP Group LLC

(57) ABSTRACT
A spare robot controller for replacing any one of a plurality of initial robot controllers configured to control operation of respective industrial robots includes a key storage storing a plurality of shared keys and a secure storage. The spare robot controller is configured to decrypt, using one of the shared keys, an encrypted backup copy of the initial robot controller to be replaced, and to store resulting data in the secure storage. In embodiments, the is configured to extract data from the secure storage during operation and to encrypt the extracted data, using a selected one of the shared keys, for storage as a backup copy in a backup storage available to all of the initial robot controllers.

19 Claims, 1 Drawing Sheet

(56)            References Cited

U.S. PATENT DOCUMENTS

| | | | | |
|---|---|---|---|---|
| 2006/0009879 | A1 | 1/2006 | Lynch et al. | |
| 2012/0173953 | A1* | 7/2012 | Flynn | G06F 8/654 |
| | | | | 717/170 |
| 2012/0254108 | A1* | 10/2012 | Wedewer | H04W 4/60 |
| | | | | 707/610 |
| 2013/0073672 | A1* | 3/2013 | Ayed | G06F 8/61 |
| | | | | 709/217 |
| 2014/0351584 | A1* | 11/2014 | Checcucci | H04L 67/06 |
| | | | | 713/164 |
| 2016/0200455 | A1 | 7/2016 | Gadgil et al. | |
| 2017/0302456 | A1* | 10/2017 | Visoky | G05B 19/4185 |
| 2018/0023837 | A1* | 1/2018 | Kraft | H04L 41/0846 |
| | | | | 700/276 |
| 2018/0052683 | A1 | 2/2018 | Iguchi | |
| 2018/0173179 | A1* | 6/2018 | Basterash | G05B 19/042 |
| 2018/0341556 | A1* | 11/2018 | Lin | G06F 11/1464 |
| 2019/0022856 | A1* | 1/2019 | Kulläng | G05B 19/414 |
| 2019/0280884 | A1* | 9/2019 | Kameo | G06F 8/65 |
| 2020/0272455 | A1* | 8/2020 | Mezaael | B60R 16/023 |
| 2020/0363855 | A1* | 11/2020 | Basterash | G06F 1/3203 |
| 2020/0379660 | A1* | 12/2020 | Ciudad | G06F 3/0653 |
| 2021/0400788 | A1* | 12/2021 | Mekenkamp | H05B 47/175 |

FOREIGN PATENT DOCUMENTS

| | | | |
|---|---|---|---|
| JP | 2009104380 | A | 5/2009 |
| WO | 2020098486 | A1 | 5/2020 |

OTHER PUBLICATIONS

European Office Action; Application No. 20 720 435.5; Issued: Apr. 30, 2025; 9 Pages.

* cited by examiner

SPARE ROBOT CONTROLLER

TECHNICAL FIELD

The present disclosure relates to the field of robotic control and in particular to methods and devices for managing a system configuration of a robot controller when the robot controller is to be replaced.

BACKGROUND

A robot controller controls movements and other behavior of an industrial robot in accordance with a system configuration. The system configuration may comprise user-defined project data, historic data relating to past operation of the robot, as well as project-independent software and configuration data provisioned by a manufacturer or integrator. It is common practice to store a backup copy of the system configuration in a highly reliable backup storage.

In the interest of minimizing costly downtime, a robot controller which becomes defective may be replaced by a spare (substitute) robot controller, either temporarily while the defective robot controller is being repaired, or permanently. Quasi-universal spare robot controllers, capable of replacing any robot controller of a given type in use in an industrial production system, are generally preferred over the costly option of maintaining a dedicated spare robot controller for each active robot controller. To achieve this by conventional means, service personnel are granted access to the backup storage (e.g., by the sharing of passwords or encryption codes), so that they may restore a suitable system configuration from the defective robot controller's most recent backup copy and load it into the spare robot controller.

However, the data protection of the system configurations is marginally worsened for each new employee who is authorized to access the backup storage. It is particularly awkward to extend the authorized circle outside a company, as is the case with external service personnel. It is reasonable to assume that the market for outsourced servicing of a robot machinery would grow significantly if there was a technical solution for making data available to a spare robot controller without disclosing the data to service personnel.

SUMMARY

One objective is to propose methods and devices which overcome or at least mitigate the shortcomings discussed in the preceding section. This objective is achieved by the invention according to the independent claims.

A first aspect of the invention makes available a method for providing a spare robot controller, which is to replace an initial robot controller configured to control operation of an industrial robot. In one embodiment, the method comprises: supplying at least a shared key $K_{10}$ to the spare robot controller; loading or enabling loading of a backup copy $\{C\}_{K_{10}}$ encrypted with the shared key into the spare robot controller; and causing the spare robot controller to decrypt the loaded backup copy using the shared key and store resulting data C in a secure storage of the spare robot controller.

Because the backup copy is loaded into the spare robot controller in encrypted form according to the method, the loading step is not vulnerable as it does not expose unprotected backup data. As a further advantage, the method is structured to enable the supplying of the shared key to be separated into a step of its own, which can be carried out in advance (pre-programming) by an authorized person or small circle of such persons. Still further, the method makes it possible to use a shared backup storage containing backup copies deposited by multiple robot controllers, which are mutually protected by the use of different encryption keys.

In one embodiment, the spare robot controller is supplied with at least one further shared key prior to the loading of the encrypted backup copy. This may enable the backup controller to decrypt backup copies from any of the robot controllers operating in a production line, factory or other set of robot controllers that it is intended to replace. The backup copies may be stored in a common backup storage or in multiple locations. The supplying of multiple shared keys furthermore makes it possible to perform key maintenance, including key replacement, when the spare robot controller replaces the initial robot controller. This may be advisable if non-authorized personnel are entrusted with the repair of the defective robot controller. For example, the spare robot controller will be able to use one of the supplied shared keys to decrypt the loaded backup copy and another key to encrypt future backup copies.

A second aspect of the invention proposes a configurable spare robot controller adapted to replace any one of a plurality of initial robot controllers configured to control operation of respective industrial robots. The spare robot controller comprises a key storage storing a plurality of shared keys $K_{10}$, $K_{20}$, $K_{30}$, which have been supplied to the spare robot controller, and a secure storage. The spare robot controller is configured to decrypt, using one of the shared keys, an encrypted backup copy $\{C\}_{K_{10}}$ of the initial robot controller to be replaced and to store resulting data C in the secure storage. This corresponds, in the terminology introduced above, to a robot controller after pre-programming. In one embodiment, the spare robot controller is configured to extract data from the secure storage during operation and to encrypt the extracted data, using a selected one of the shared keys, for storage as a backup copy in a backup storage available to all of the initial robot controllers.

Because the spare robot controller can receive and process the backup copy in encrypted form, the loading normally does not compromise the protection of the backup data. Moreover, while the spare robot controller is able to receive any of the potential backup copies to be restored, both memory content and functionalities remain fully generic and independent of the initial robot controller which it will eventually replace. Such later handling (individualization) can be left with service personnel in no need of a full safety screening. The spare robot controller according to this aspect is clearly suitable to cooperate with a shared backup storage containing backup copies deposited by multiple robot controllers.

Generally, all terms used in the claims are to be interpreted according to their ordinary meaning in the technical field, unless explicitly defined otherwise herein. In particular, a "key" or "shared key" may refer to any of a code, password or other secret representable in human-readable or computer-readable form, an electronic key stored in circuitry, a cryptographic function implemented by a chipset, and the like. The modifier "spare" indicates an intended use of the robot controller without any further technical or commercial implications. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, on which.

DETAILED DESCRIPTION

The aspects of the present invention will now be described more fully hereinafter with reference to the accompanying drawings, on which certain embodiments of the invention are shown. These aspects may, however, be embodied in many different forms and should not be construed as limiting; rather, the embodiments are provided by way of example so that this disclosure will be thorough and complete, and to fully convey the scope of all aspects of invention to those skilled in the art. Like numbers refer to like elements throughout the description.

Figure 1:
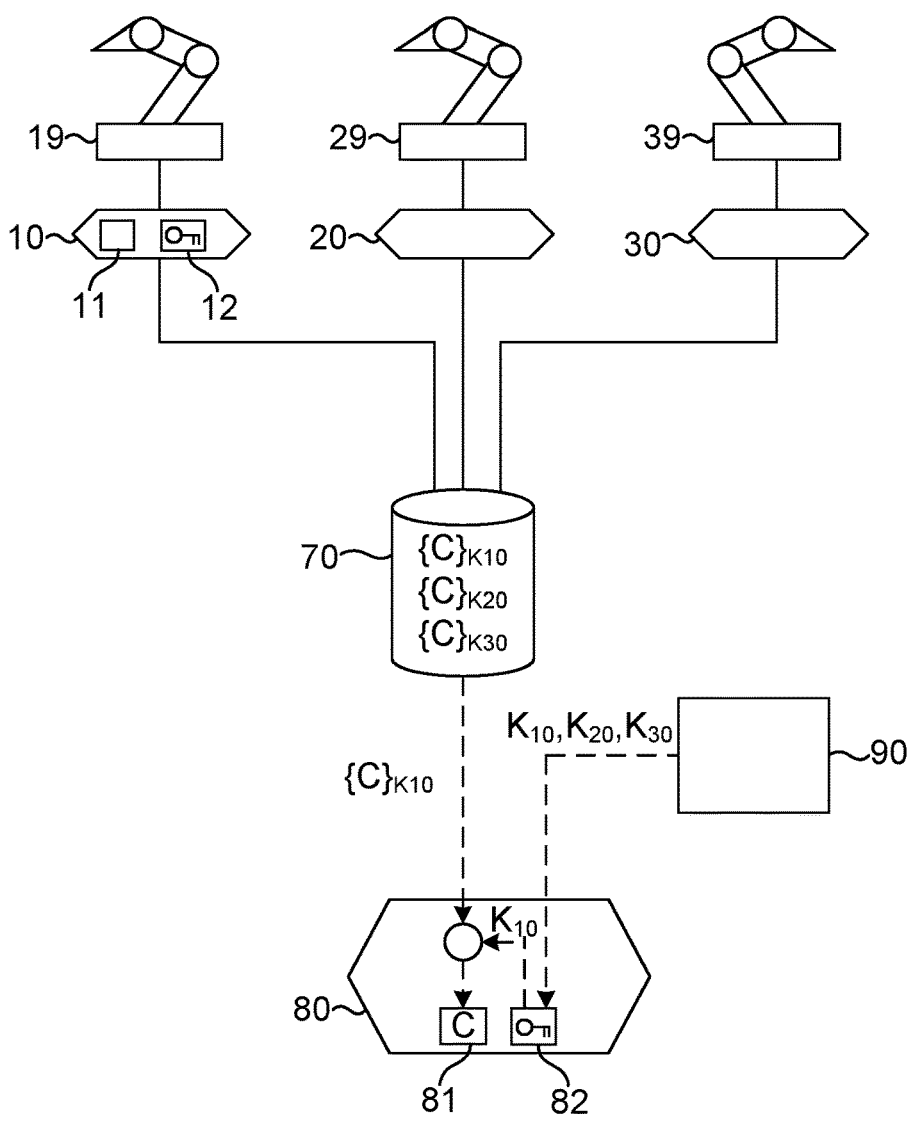
FIG. 1 illustrates an industrial robot system in which an embodiment of the invention is implemented.

FIG. 1 is a schematic illustration of an industrial robot system comprising a plurality of robot controllers 10, 20, 30 controlling operation of respective industrial robots 19, 29, 39 and sharing a common backup storage 70. As illustrated by way of example for the leftmost robot controller 10, each robot controller 10, 20, 30 comprises at least a secure storage 11 and a key storage 12.

The secure storage 11 may be sized and adapted to hold one or more of: a system configuration of the robot controller 10, project-related data, generic software, data relating to past operation of the robot 19 and user settings. Clearly at least some of the enabled data may be changed or extended as a result of operating the robot controller 10 and/or robot 19, which makes regular backup copying advisable.

The secure storage 11 may be secure in the sense that all stored data are encrypted, so that any third parties gaining access to the stored bit pattern are unable to read the encoded information without access to corresponding decryption. The secure storage 11 is preferably a non-volatile memory. Such non-volatile memory may be supplemented by a dedicated runtime memory, to which data from the secure storage 11 may be moved for execution; the runtime memory preferably has protective modalities that prevent illicit access to the data to the same security standard as applies for the secure storage 11. The secure storage 11, together with any runtime memory in the robot controller 10, constitutes an isolated trust domain.

The key storage 12 stores at least a shared key $K_{10}$, which the robot controller 10 uses to produce encrypted backup copies $\{C\}_{K_{10}}$ to be deposited in the backup storage 70. The backup copy C may be a complete image of the secure storage 11 or a subset thereof that is sufficient to prepare a spare robot controller replacing the robot controller 10. An encryption key or other secret may be used to protect the secure storage 11, which may or may not coincide with the shared key $K_{10}$. It is preferable from the point of view of cybersecurity if the shared key $K_{10}$ is distinct from the key or secret that protects the secure storage 11.

The key storage 12 preferably has a high level of intrusion protection. Further preferably, it allows data encryption without outputting or otherwise disclosing the shared key $K_{10}$. In particular, the key storage 12 may include logic preventing any onward sharing (or passing-on) of the keys deposited therein; the sharing of keys to robot controllers may be a faculty exclusive to an appointed key owner 90. The key owner 90 may be a unique party entrusted with the key management responsibilities in the system, including the authority to create, revoke or share a particular key. The key owner 90 may be, or have been appointed by, a system administrator. It is not necessary for the robot controller 10 to be able to decrypt an encrypted backup copy $\{C\}_{K_{10}}$ that it has deposited in the backup storage 70. The decryption ability may be included as an optional feature, e.g., by the use of program code similar to the program code that implements decryption of the loaded backup copy in the spare robot controller 80 to be described below.

The further robot controllers 20, 30 hold respective shared keys $K_{20}$, $K_{30}$, which may or may not differ from the key $K_{10}$ of the leftmost robot controller 10. If a robot controller 10 uses a key unknown to the neighbor robot controllers 20, 30, it is certain that its encrypted backup copy in the backup storage 70 is unreadable by these. With the ongoing transition to commoditized network storage solutions ("cloud"), where it is not uncommon for one backup storage server to support robot controllers that belong to different companies or institutions, the use of distinct keys may help maintain a high standard of data security. In the interest of reducing costly key acquisition and key administration, however, all robot controllers 10, 20, 30 within one factory or one production line may use the same shared key or a minimal number of shared keys.

The solid lines in FIG. 1 represent wired or wireless data network connections. In a simplified embodiment, where the backup storage 70 is local and infrequent backups suffice, the backup data from each robot controller 10, 20, 30 may be transferred to the backup storage 70 after being temporarily stored in a portable memory. This eliminates the need to implement strong network safety and may be implemented without significant operator intervention.

To enable timely replacement if one of the robot controllers 10, 20, 30 in the system becomes defective, a spare robot controller 80 is prepared. The spare robot controller 80 may be structurally similar to any one of the robot controllers 10, 20, 30 shown in the upper part of FIG. 1, i.e., including a secure storage 81 and key storage 82 with same or corresponding characteristics. In particular, the secure storage 81 is included in an isolated trust domain inside the spare robot controller 80. The secure storage 81 is suitable to receive data resulting from decryption of an encrypted backup copy of a robot controller (initial robot controller) to be replaced; for this decryption, one of the shared keys in the key storage 82 is used. Furthermore, the spare robot controller 80 is configured to extract, during operation, data from the secure storage 81 and to encrypt the extracted data, using a selected one of the shared keys, and to store the result of the encryption as a backup copy in the backup storage 70. This latter corresponds to the normal functioning of one of the robot controllers 10, 20, 30.

Figure 2:
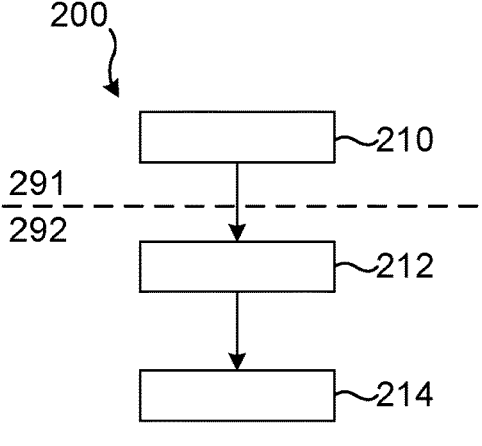
FIG. 2 is a flowchart of a two-phase method for providing a spare robot controller according to an embodiment of the invention.

Accordingly, the spare robot controller 80 according to this embodiment has been prepared at least by undergoing a pre-programming phase 291 (see FIG. 2). The pre-programming phase 291 includes a first step 210 in which a plurality of shared keys $K_{10}$, $K_{20}$, $K_{30}$ have been deposited in the key storage 82, as suggested by a broken-line arrow in FIG. 1. This enables the spare robot controller 80 to replace any of the robot controllers 10, 20, 30 in the system. The pre-programming phase 291 may have been carried out by a key owner 90 or their delegate, or by a computer-implemented or computer-supported system functionality with this role.

Once it is known which one of the robot controllers 10, 20, 30 the spare robot controller 80 shall replace, a subsequent individualization phase 292 (see FIG. 2) can be initiated. Protection is sought, in particular, for the spare robot controller 80 having undergone the pre-programming phase 291 but not yet the individualization phase 292.

The individualization phase 292 can be carried out by a party authorized to only access the backup copies in encrypted form, such as by personnel with authority to grant the spare robot controller 80 read access to the backup storage 70 but without any of the shared keys $K_{10}$, $K_{20}$, $K_{30}$. The individualization phase 292 includes a step 212 of enabling loading of a backup copy $\{C\}_{K_{10}}$ which has been encrypted with one of the shared keys, into the spare robot controller 80. This is illustrated by a vertical broken-line arrow. The loading may be performed by authorizing the spare robot controller 80 to access the backup storage 70 and instructing it to retrieve the backup copy; alternatively, the party carrying out the individualization phase 292 retrieves the backup copy and supplies it to the spare robot controller 80; as a still further option, the backup storage 70 is instructed to supply the backup copy to the spare robot controller 80 in course of being individualized.

The individualization phase 292 further includes a step 214 of causing the spare robot controller to decrypt the loaded backup copy using one of the shared keys and store the resulting data C in its secure storage 81. The decryption process is illustrated by a circle inside the spare robot controller 81 at which two broken-line arrows converge and one leaves. Specifically, the spare robot controller 80 may be configured to receive an instruction as to which one of the shared keys to use. Alternatively, the spare robot controller 80 is configured to try to decrypt the loaded encrypted backup copy with the shared keys sequentially until the decryption is successful. The spare robot controller 80 may verify that decryption was successful by computing a checksum of the resulting data and comparing this with a pre-agreed or pre-specified value; as a simpler alternative, a cyclic redundancy check (CRC) may be used.

After step 214, the secure storage 81 normally contains a replica of the latest backup copy deposited by the defective robot controller, so that the individualized spare robot controller 80 is fit to substitute the latter in the system. The deployment of the individualized spare robot controller 80 may include connecting it to the backup storage 70 and to the one of the robots 19, 29, 39 that is to be controlled; necessary settings and other input that is not derivable from the restored backup copy may be entered as well. As noted above, the data C is protected from unauthorized access in the secure storage 81.

FIG. 2 is a flowchart of a method 200 for providing a spare robot controller 80. The method comprises the steps 210, 212, 214, which have been described above. The method 200 may be executed by a human operator, such as a system administrator. Alternatively, the method 200 can be implemented by a programmable computer, wherein the steps corresponds to computer-readable instructions forming a computer program. Optionally, the computer program is stored on a transitory or non-transitory, volatile or non-volatile data carrier suitable for distribution, storage or both.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of maintaining an industrial robot that has an initial robot controller which is configured to control operation of the industrial robot, the method comprising:

providing a spare robot controller for said industrial robot;

during a pre-programming phase, supplying a plurality of shared keys ($K_{10}$, $K_{20}$, $K_{30}$) to the spare robot controller;

enabling loading of a backup copy ($\{C\}_{K_{10}}$, $\{C\}_{K_{20}}$, $\{C\}_{K_{30}}$) of the initial robot controller encrypted with one of the plurality of shared keys into the spare robot controller from a backup storage available to a plurality of initial robot controllers;

causing the spare robot controller to decrypt the loaded backup copy by sequentially trying the plurality of shared keys and store resulting data (C) in a secure storage of the spare robot controller to configure the spare robot controller with a system configuration of the initial robot controller; and deploying the spare robot controller to the industrial robot by replacing the initial robot controller with the spare robot controller and connecting the spare robot controller to said industrial robot.

2. The method of claim 1, wherein at least one the shared keys has been shared with the initial robot controller.

3. The method of claim 2, wherein the encrypted backup copy is loaded from a backup storage.

4. The method of claim 2, wherein the shared keys are supplied to the spare robot controller prior to the loading of the encrypted backup copy.

5. The method of claim 1, wherein the encrypted backup copy is loaded from a backup storage.

6. The method of claim 5, wherein the backup storage is available to one or more further robot controllers.

7. The method of claim 6, wherein the backup storage comprises at least one backup copy encrypted using another one of the plurality of shared keys.

8. The method of claim 1, wherein the shared keys are supplied to the spare robot controller prior to the loading of the encrypted backup copy.

9. The method of claim 8, wherein the pre-programming phase is separate from an individualization phase including the loading of the encrypted backup copy.

10. The method of claim 9, wherein the pre-programming phase is performed by an owner of one of the plurality of shared keys.

11. The method of claim 10, wherein said owner is an owner of another one of the plurality of shared keys.

12. The method of claim 10, wherein said owner is a system administrator.

13. The method of claim 1, wherein the secure storage of the spare robot controller is an isolated trust domain.

14. The method of claim 1, wherein the backup copy includes one or more of:

a system configuration of the initial robot controller;

project-related data;

generic software;

data relating to past operation of the robot;

user settings.

15. The method of claim 1, wherein the secure storage is protected by an encryption key.

16. The method of claim 1, further comprising:

during operation of the industrial robot with the spare robot controller, extracting data from the secure storage and encrypting the extracted data using one of the shared keys; and transmitting the encrypted data to the backup storage.

17. The method of claim 1, wherein:

each shared key corresponds to one of the plurality of initial robot controllers; and the backup copy is enabled to be loaded from the backup storage available to another one or more of the plurality of initial robot controllers, which correspond to respective further shared keys.

18. A configurable spare robot controller adapted to replace any one of a plurality of initial robot controllers configured to control operation of respective industrial robots, the spare robot controller comprising:

a key storage storing a plurality of shared keys ($K_{10}$, $K_{20}$, $K_{30}$) received during a pre-programming phase; and a secure storage, wherein the spare robot controller is configured to decrypt an encrypted backup copy ($\{C\}_{K_{10}}$, $\{C\}_{K_{20}}$, $\{C\}_{K_{30}}$) of one of the initial robot controllers by sequentially trying the plurality of shared keys, and to store resulting data (C) in the secure storage to configure the spare robot controller with a system configuration of said one of the initial robot controllers;

wherein the spare robot controller is configured for deployment to the respective industrial robot associated with said one of the initial robot controllers via replacing said one of the initial robot controllers with the spare robot controller and connecting the spare robot controller to the respective industrial robot.

19. The spare robot controller of claim 18, further configured to extract data from the secure storage during operation and to encrypt the extracted data, using a selected one of the shared keys, for storage as a backup copy in a backup storage available to all of the initial robot controllers.

\* \* \* \* \*